United States Patent [19]

Treants

[11] Patent Number: 5,086,874
[45] Date of Patent: Feb. 11, 1992

[54] TREE CLIMBING APPARATUS

[76] Inventor: Bill Treants, 5329 South Skyline Dr., New Berlin, Wis. 53151

[21] Appl. No.: 579,649

[22] Filed: Sep. 10, 1990

[51] Int. Cl.⁵ .................... A01M 31/02; A63B 27/00
[52] U.S. Cl. .................................... 182/136; 182/187
[58] Field of Search ................ 182/187, 188, 133–136

[56] References Cited

U.S. PATENT DOCUMENTS

| | | | |
|---|---|---|---|
| 3,352,379 | 11/1967 | Riggs | 182/20 |
| 3,520,383 | 7/1970 | Loock | 182/133 |
| 3,568,797 | 3/1971 | Hardy | 182/142 |
| 3,727,723 | 4/1973 | Pitcairn et al. | 182/133 |
| 3,731,762 | 5/1973 | Sirls | 182/142 |
| 3,960,240 | 6/1976 | Cotton | 182/20 |
| 4,008,785 | 2/1977 | Mugnaini | 182/133 |
| 4,205,733 | 6/1980 | Wade | 182/187 |
| 4,316,526 | 2/1982 | Amacker | 182/135 |
| 4,321,982 | 3/1982 | Strickland | 182/20 |
| 4,321,983 | 3/1982 | Nelson | 182/136 |
| 4,331,216 | 5/1982 | Amacker | 182/135 |
| 4,347,913 | 9/1982 | Cromer Jr. | 182/142 |
| 4,410,066 | 10/1983 | Swett | 182/135 |
| 4,488,620 | 12/1984 | Gibson | 182/135 |
| 4,593,789 | 6/1986 | Treants | 182/142 |
| 4,953,662 | 9/1990 | Porter | 182/187 |

OTHER PUBLICATIONS

Brochure of Woods and Water, Inc. entitled "Quick & Quiet" (undated and consisting of 4 pages).

Primary Examiner—Reinaldo P. Machado
Attorney, Agent, or Firm—Quarles & Brady

[57] ABSTRACT

A tree or the like climbing apparatus which includes a platform member, having both a seat portion and a foot support portion and an independent foot climber member. The platform member and the foot climber member are raised or lowered over a tree trunk by means of tree trunk engaging members on both the platform member and the foot climber member having parallel rows of teeth arranged in an arcuate manner. Opposite each engaging member is an adjustable cable support member to surround the tree trunk and provide a support means for engaging a portion of the tree trunk opposite the tree trunk engaging members. Rollers are positioned over each cable portion for part of its length to ensure smooth ascent and descent of the tree. Each cable portion includes an adjustable winch at one end, which secures the cable to the platform member and foot climber member, and also locks the platform member and foot climber member in place until further movement is desired.

15 Claims, 2 Drawing Sheets

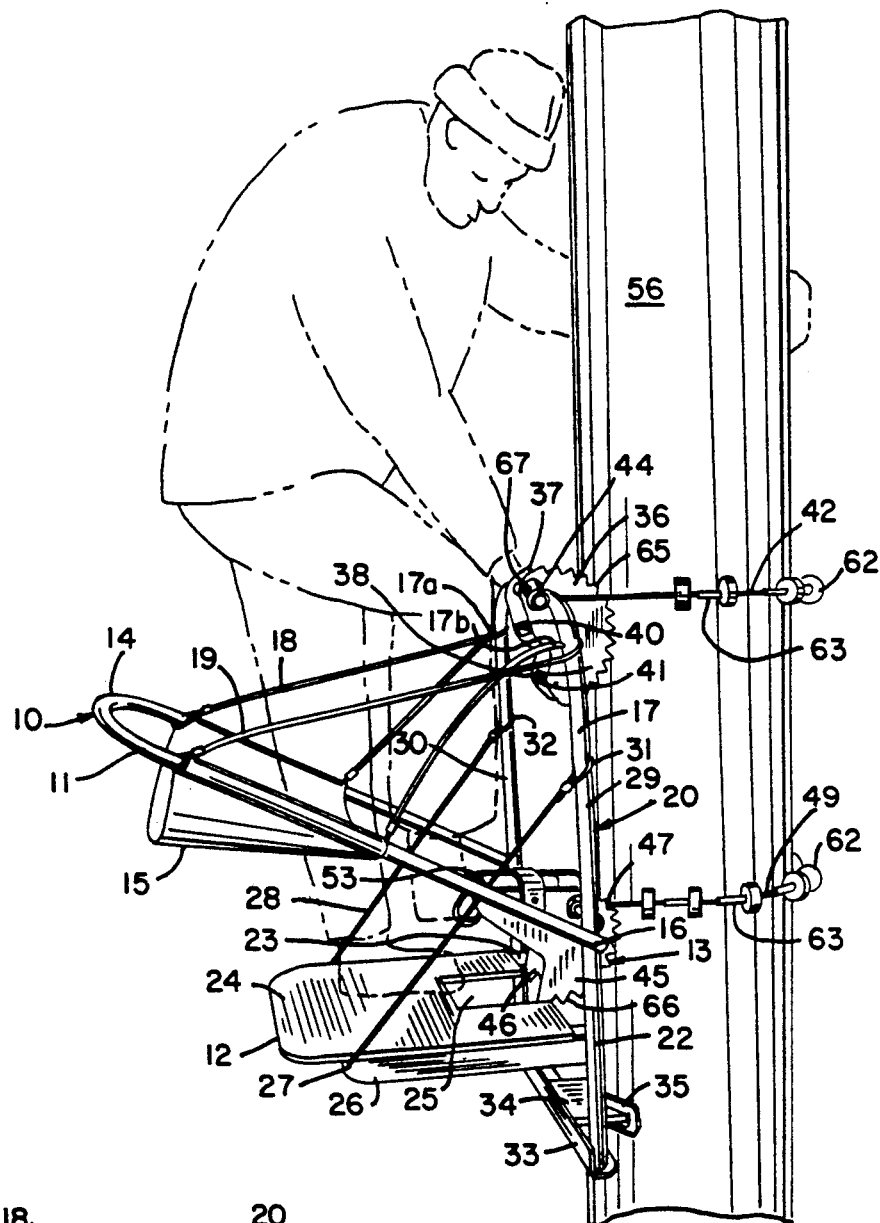
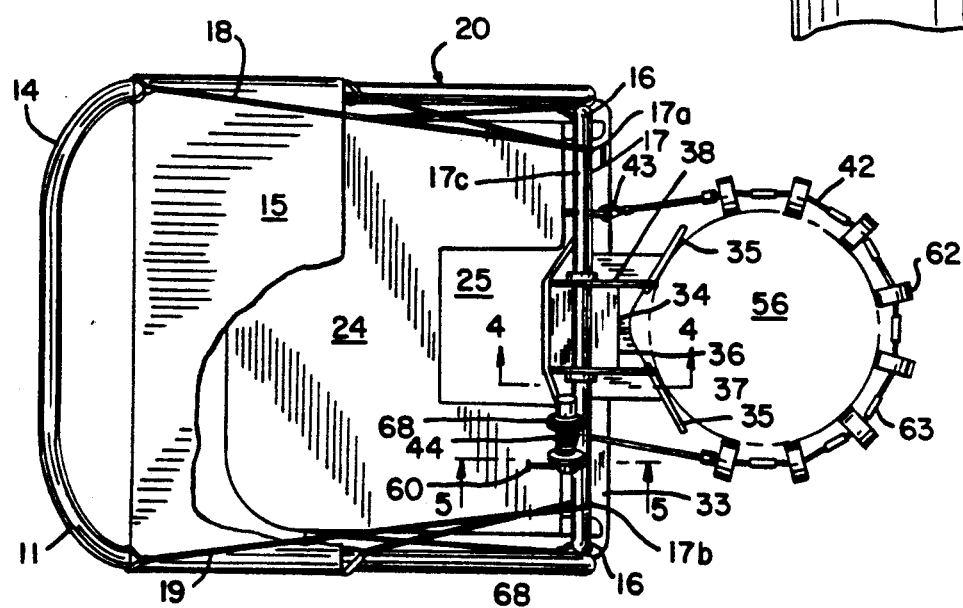

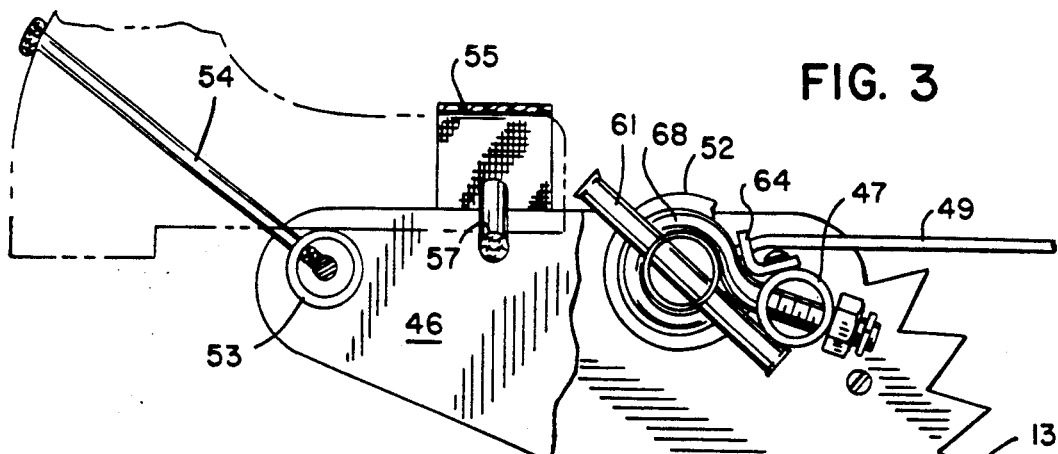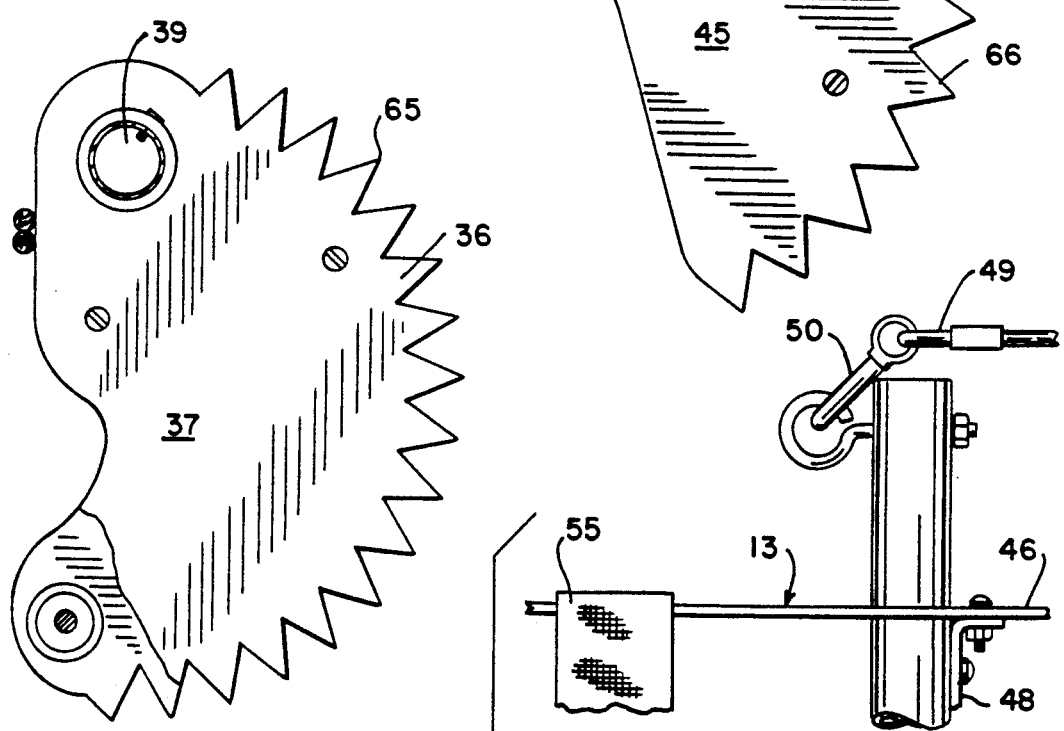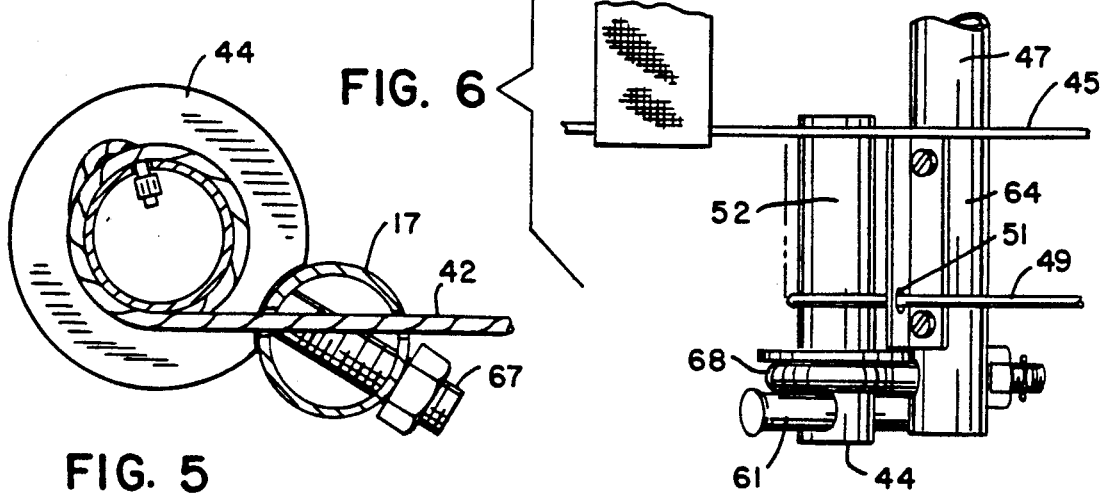

TREE CLIMBING APPARATUS

BACKGROUND OF THE INVENTION

This invention relates to a tree climbing apparatus or the like which is easy to use and can provide a smooth and safe ascending and descending operation. More particularly, this invention relates to an apparatus of the foregoing type which includes two tree engaging members: a platform member composed of a seat portion and a foot support portion; and an independent foot climber member, each of which engages the tree with teeth members and provides support through the use of cable members which surround the tree and adjust to accommodate varying tree diameters during ascent and descent and adjust automatically to the taper of a tree.

U.S. Pat. No. 4,593,789 provides a tree climbing apparatus having a single tree engaging unit and an adjustable strap to fit varying tree diameters. U.S. Pat. No. 4,321,983 provides a tree climbing platform device wherein gripping portions can be moved upwardly along the tree by the climber so as to elevate the platform. This latter patent provides for a wedging engagement on both sides of the tree and a foot support member separate from a platform member. U.S. Pat. No. 4,316,526 provides for a tree climbing device having both a platform member which functions as a seat and a separate foot support member. As described therein, both the platform member and the foot support member engage the tree with gripping structures. U.S. Pat. Nos. 4,488,620, 4,316,526 and 4,331,216 similarly incorporate separate seat and foot support platforms, each of which engage the tree separately through the use of wedging devices.

There is also available in the marketplace a tree stand from Woods and Water, Inc. in Milwaukee, Wis. which utilizes a standing type platform with opposing and tree engaging members of the penetrating type. This particular unit is utilized to climb a tree in a bear hug like fashion. The tree stand is lifted by the climber's feet and is raised and lowered by a rocker-like motion between the engaging members.

The prior art does not provide a tree climbing apparatus which affords ease of assembly and operation, resulting in fast and smooth ascent and descent of a tree comparable to the present invention. Neither does the prior art incorporate a mechanism for tree engagement which combines a unitary seat and foot platform and an independent foot climber member resulting in increased comfort in using the apparatus after ascent of the tree. The prior art also does not provide for a method of tree engagement by means of teeth members disposed in an arcuate manner, thereby making slippage less likely and providing a greater margin of engagement should the support mechanism loosen, for whatever reason and adjust automatically to the taper of a tree.

It is an advantage of the present invention to provide a tree climbing apparatus which is quick and easy to carry, assemble and operate. Another advantage of the invention is the design of a foot support and seat combination which makes the invention comfortable to use. Yet another advantage is the smooth ascent and descent afforded by the optional rollers on the cable support members surrounding the tree trunk. Another design advantage of the invention is the great freedom of movement afforded to the hunter by this design when positioned in the tree. Other advantages include: a design wherein the seat support frame as well as side cable members help to prevent the user from falling from the stand when in use; the use of two separate engaging devices, one on the platform member and another on the foot climber member which enhances safety, particularly when the unit is in motion during ascent or descent of the tree; the use of two parallel rows of teeth members arranged in an arcuate manner on each engaging device, thereby enhancing safety by providing for constant engagement of both climbing members when in use; the use of locking winch devices on each engaging member, which enhances safety by preventing a cable support member from loosening unintentionally; and an apparatus which can be readily constructed from available parts and without special tooling, thus providing a unit which is relatively low in cost.

SUMMARY OF THE INVENTION

The disadvantages of the prior art are avoided and the foregoing advantages are accomplished by the tree climbing apparatus of this invention which has both: (i) a platform member, including both a seat portion and a foot support portion, and (ii) an independent foot climber member, each member adapted to be raised or lowered over a tree trunk. Tree trunk engaging means are operatively associated with the platform and foot climber members to releasably engage the tree trunk.

In a preferred manner, the tree trunk engaging means include a cable support member extending on either side of engaging mechanisms attached to the platform member and the foot climber member which surround the tree trunk on the side opposite the platform and reattach to the engaging members on their opposite sides. The tree trunk engaging means include two parallel rows or pairs of teeth members disposed in an arcuate manner extending from both the platform member and the foot climber member. The arcuate placement of the teeth members allows for constant engagement by both the platform member and the foot climber member as movement is made during ascent or descent of the tree.

In one aspect, the foregoing apparatus has a platform member with a cut-out portion for passage of the foot climber member therethrough.

In another aspect, the platform member and the foot climber member each include the teeth members and rollers, the rollers being spaced from the teeth members in such a fashion so as to engage the tree trunk opposite the teeth members.

In still another aspect of the invention, the tree trunk engaging means on both the platform member and the foot climber member include a winch member to adjust the cable support member.

In another aspect of the invention the platform member includes a forward frame with a seat portion pivotally attached thereto and a cable member extending between the frame portion and the seat portion.

In yet another aspect of the invention descent from a tree can be effected with a single rope which is looped over a tree branch and tied to climbing apparatus, the climbing apparatus having tree engaging teeth which readily engages the tree if rappelling is too fast, thereby affording a safety feature.

In still an additional aspect of the apparatus, the platform member includes a pivotal stabilizer portion connected to the platform member below the foot support portion.

In yet other aspects of the invention, the foot climber member includes foot engaging straps and is used independently from the platform member for tree climbing purposes.

BRIEF DESCRIPTION OF THE DRAWINGS

A better understanding of the present invention can be accomplished by reference to the drawings wherein:

FIG. 1 a perspective view of the tree climbing apparatus of this invention in simulated operation, with the operator of shown in phantom lines.

FIG. 2 a top view of the platform member only as it would appear in operation with the seat portion partially cut away, exposing the foot support portion beneath it.

FIG. 3 is a side view of the foot climber member with part of the member broken away, showing how such member would be utilized, with a foot, shown in phantom lines, fitted in the foot engaging straps.

FIG. 4 is an enlarged side view of the engaging means of the member with a portion of the member broken away.

FIG. 5 is a sectional view of the winch mechanism which is attached to the engaging means of the platform member.

FIG. 6 is a top fragmentary view of the foot climber member.

DETAILED DESCRIPTION OF THE PREFERRED EMBODIMENT

The tree stand or climbing apparatus generally 10 is shown in FIG. 1 as it appears in operation. It includes a platform member generally 20, having both a seat portion 11 and a foot support portion 12. There is also an independent foot climber member 13. The seat portion 11 is formed from a tubular U-shaped seat support frame 14 and a seat 15 made of cloth, vinyl or similar material. It is overlapped with itself and stitched together on the sides thereof in such a manner as to create a tubular opening on either side thereof of a sufficiently large diameter to enable seat 15 to slide over seat support frame 14 upon assembly of the apparatus.

The seat portion 11 is attached in a pivotal manner such as by the pivotal connector 16, to a U-shaped tubular support frame 17. The seat portion 11 is also connected to the support frame 17 by means of two cable members 18 and 19. One end of cable member 18 is fastened around the seat support frame 14 on the outer edge of the seat 15. The cable member 18 is then passed through a hole 17a in the support frame 17 and fastened at its opposite end at the inner edge of the seat 15 around seat support frame 14 on the same side thereof. Cable member 19 is similarly fastened on the other side of seat support frame 14 by passing such cable member 19 through hole 17b in support frame 17. Cable members 18 and 19 are securely attached and not detachable after assembly. Cable members 18 and 19 are also of sufficient size to easily support the combined weight of a large man and his hunting gear. They are also of sufficient length to allow the seat portion 11 to be lowered until seat support frame 14 is approximately, but not more than, 90° from support frame 17.

The foot support portion 12 of platform member 20 is also attached in a pivotal manner to support frame 17 and held in position when in use by support cable 28. It includes a platform 24 made of wood or other rigid and weight bearing material, having an overall U-shaped appearance, with a rectangular opening portion 25 in the center of platform 24. Affixed to platform 24 on either side thereof are two metal L-shaped supports, such as support 26. L-shaped support 26 and a similar support o the opposite side of platform 24 (not shown) are attached by the pivotal connectors 22 and 23 to the support frame 17. Support cable 28 is affixed to a side 29 of support frame 17 by passing the cable 28 through a hole 31 in the support frame 17 and fastening it to itself by means of a securing device. The opposite end of support cable 28 passes through a hole 27 in the outer end of L-shaped frame 26 and through a similar hole (not shown) on the L-shaped frame on the opposite side of the platform. It then passes through a hole 32 in a side 30 of support frame 17 and fastens on itself in a manner previously described. Holes 31 and 32 are at an approximately equal height opposite each other on support frame 17. Support cable 28 is of approximately the same diameter as cables 18 and 19.

At the open end of U-shaped support frame 17 is an L-shaped piece 33 which is preferably made of metal and provides support for a stabilizing member 34. Stabilizing member 34 has wing portions 35 connected thereto which are designed to fit securely against the tree surface (see FIG. 2) when platform member 20 is positioned on the surface of the tree trunk 56.

A hand operated tree engaging unit 36 is supported at the top of support frame 17. It has two identical tree gripping members 37 and 38 with openings for rotatable passage on the support frame 17. Each have a set of teeth members 65 for tree engaging purposes arranged in an arcuate manner (see FIG. 4). They are preferably made of metal. The opening 39 in the engaging unit 36 is sufficiently large to allow the unit to freely rotate around support frame 17. The metal engaging pieces 37 and 38 are spaced approximately four and one-half inches apart and connected by retaining bars 40 and 41, which support the engaging device and keep the metal engaging pieces 37 and 38 in a fixed position parallel to one another at all times.

A cable support member 42 is connected to the top portion of support frame 17 on both sides of the tree engaging unit 36, as indicated in FIG. 2. On one side, the cable member 42 connects to support frame 17 with a hook-type fastening device 43 which is detachable so as to allow the cable support member to be placed around the tree prior to operation. However, when in use, the fastening device 43 is in a locked position and cannot disconnect from platform member 20 accidentally. On the opposite side of tree engaging unit 36, cable support member 42 passes through support frame 17 and wraps around winch 44 (see FIG. 5), which allows the user of the climbing apparatus 10 to tighten or loosen cable support member 42 during ascent and descent in accordance with the tapering of the tree, thereby ensuring constant engagement of teeth members 65 with the tree surface. Winch 44 is bolted to support frame 17 by two ring bolts such as ring bolt 67 on either side thereof. Winch 44, as it is turned, has the usual locking device with stop rod 60 so that excess cable 42 cannot be released accidentally. This can be best seen in conjunction with the foot climber member 13 with winch 52 and stop rod 61 (see FIG. 3). Rod 60 engages frame 17 to prevent undesired unwinding of the winch 44. The cable support member 42 is, on a partial length thereof, passed through roller devices 62 which ride over the tree surface, thereby allowing a smooth ascent or descent of the tree. Roller devices 62 are preferably made of rigid plastic and are separated along the cable by spacing devices 63, also preferably made of plastic and each of approximately two inches in length.

Foot climber member generally 13 is independent from, and not connected to, platform member 20. As shown in FIG. 1, and in a manner similar to tree engaging unit 36, foot climber member 13 has two identical tree gripping members 45 and 46, each having a set of teeth 66 arranged in an arcuate manner for tree engaging purposes. The members 45 and 46 are preferably made of metal and positioned parallel to each other. They are supported in position by the support bar 47 and the L-shaped bracket 48 which holds the two rows of tree gripping members 45 and 46 in fixed position (see FIG. 6).

In a manner similar to tree engaging unit 36, a cable support member 49 is connected at both ends of support bar 47. Cable support member 49 connects at one side to foot climber member 13 with a hook-type fastening device 50 (see FIG. 6) which is detachable so as to allow cable support member 49 to be wound around the tree prior to use. Once connected, however, the fastening device 50 locks in place and cannot become disconnected from foot climber member 13 accidentally. The cable support member 49 attaches to the opposite end of support bar 47 by passing through hole 51 in support bracket 64 and wrapping around winch 52, thereby allowing the user of the invention to tighten or loosen cable support member 49 during ascent or descent in accordance with the tapering of the tree. This adjustability feature of the cable support member 49 ensures constant engagement of the teeth 66 on members 45 and 46 with the tree surface 56. Referring to FIG. 3, winch 52 is bolted to foot climber member 13 by means of ring bolt 68. Winch 15 has a locking device with rod 61 so that excess cable 49 cannot be released accidentally while turning winch 52. Cable support member 49, as is true of cable support 42, has roller devices 62 which ride over the surface of tree trunk 56. Similar to cable support member 42, the roller devices 62 on cable support member 49 are separated by spacing devices 63.

Referring again to FIG. 3, at the end of foot climber member 13 opposite the teeth of members 45 and 46, is positioned a support bar 53 to which is attached a foot engaging cord 54. It is fastened on either side of support bar 53, and designed to fit securely around the back of the foot when foot climber member 13 is in use. A foot engaging strap 55 is attached to the outside of the tree gripping members 45 and 46 so that it is on top of foot climber member 13 and parallel to support bar 53. Attached to the foot engaging strap 55 on either side thereof is foot cable 57 which extends below the foot strap 65 to provide upper and lower foot engaging supports. Additional foot support is provided by support bar 53 (see FIG. 3).

Operation

Platform member 20 is fully collapsible through the pivotal connections 22, 23 and 16 on the foot support portion 12 and on the seat portion 11, for easy carrying to the site where it will be used. When the appropriate tree trunk 56 is selected, the climbing apparatus is readily engaged on the tree trunk 56 by unhooking the cable support member 42 at fastening device 43 and wrapping cable support member 42 around the tree trunk 56 while keeping the support frame 17 in upright position. The hand operated tree engaging unit 36 is positioned so that the teeth 65 of the gripping members 37 and 38 face the tree trunk 56, as shown in FIG. 1. Winch member 44 is rotated so that cable support member 42 is of sufficient length to encompass the circumference of the tree trunk 56. Cable support member 42 is then locked in place with fastening device 43, and tightened by means of winch member 44 such that platform member 20 is securely fastened to the tree trunk 56. The cable support member 42 is then locked in position by use of rod 60. The stabilizing device 34 is thereby secured in place against the tree trunk 56, and the hand operated tree engaging unit 36 is engaged with the tree trunk 56. The foot support portion 12 and the seat portion 11 are then pivoted downward into climbing position at an approximately 90 degree angle with the support frame 17.

Next, the foot climber member 13 is positioned so that it is centered over and above the opening 25 of foot support portion 12 of platform member 20 with the teeth 66 of the tree gripping members 45 and 46 facing the tree trunk 56. Cable support member 49 is then extended around the circumference of the tree trunk 56, using the winch 52 on the foot climber member 13 to lengthen or shorten cable support member 49, as needed. Cable support member 49 is then attached by means of fastening device 50 to the side of foot climber member 13 opposite the winch device 52. Cable support member 49 is then tightened sufficiently to hold foot climber member 13 securely in place against the tree trunk 56, with the teeth members 66 engaged in the tree trunk 56. Cable support member 49 is then locked in position by use of rod 61. The user then rests one foot on foot support platform 12 and places the toe of the other foot under the foot engaging strap 55 but on top of the foot cable 57 and rests the foot on foot support bar 53. The foot is then secured in the foot climber member 13 by inserting the heel of the foot inside foot engaging cord 54.

The platform 12 is first raised by pulling on the support frame 17 to disengage tree engaging member 36 and raising the platform 12 to the level of the foot climber member 13 while one foot pushes in the foot climber member 13. Ascent of the tree is subsequently accomplished by repetition of a two step lift process wherein the climber raises the foot climber member 13 by shifting the weight of the climber's body to the platform member 20 while lifting the heel portion of the foot climber member 13. This process disengages the teeth members 66 from the tree trunk surface 56. The climber then raises the foot climber member 13 upwardly over the tree trunk surface 56 to a higher level. When at the appropriate level, the weight of the climber is shifted from the platform member 20 to the foot climber member 13, which results in a reengagement of the teeth members 66 with the tree trunk surface 56. While the climber's weight is centered on foot climber member 13, the second step is achieved by pulling the hand operated tree engaging member 36 upward and away from the tree trunk 56 so that teeth members 65 disengage from the tree trunk 56. The platform member 20 is then pulled upward over the tree surface until it is approximately level with the foot climber member 13. This can be effected by placing both hands on the retaining bar 41 of tree engaging member 36 or one on member 36 and one on the tree trunk 56. Likewise, due to the arcuate arrangement of the teeth members 65 on the hand operated tree engaging member 36, constant engagement with the tree trunk 56 is achieved during this process. These steps are repeated until the desired height is achieved. To effect a descent of the tree trunk 56, the above indicated steps are reversed with the platform 17 being lowered first and the foot climber member 13 second to the lowered level of the platform 17.

If desired, and although not necessary, the climber, can descend with a single rope placed over a branch of the tree with both ends of the rope looped around the support bar 17c. The operator descends sitting down while lifting the teeth 65 and 66 of units 36 and 13 to clear the tree. However, the teeth are ready to reengage if rappelling is too fast. This is a safety feature not previously found in tree stands.

It should be noted that, as the taper of the tree increases or decreases, the diameter of the cable support members 42 and 49 which support platform member 20 and foot climber member 13 can be adjusted to ensure constant engagement and support by using winches 44 and 52, respectively, to tighten or loosen the cable support members 42 and 49, as desired. Also, to climb around a tree with branches, the cable support members 42 and 49 are easily disconnected.

It should be further stated that automatic adjustment to tree taper is afforded in that all teeth 65 and 66 engage at different intervals while ascending and descending. This is effected by rotation of the members 37, 38, 45 and 46. Because of the geometric configuration of these members and the number of the teeth 65 and 66 they constantly engage the tree in a rotative manner due to the spring like or biasing action effected by the elasticity of the cables 42 and 49. This automatic adjustment is without use of the winches 44 and 52 or with minimum use.

It should also be observed that foot climber member 13 may be used by itself or in combination with other methods of tree climbing as an added safety feature. Further, the climbing apparatus is also effective in climbing a pole.

The present tree stand affords positioning of the climber a distance from the tree to allow better viewing and a greater feeling of safety as the climber is surrounded by portions of the stand.

As indicated by the foregoing description, the present invention provides several improved features for a tree stand climbing member. These are accomplished in a unit which is constructed from readily adaptable component parts. The invention is easily transported to the desired use site by reason of its compactness and collapsible features, yet is safely and efficiently used. Rollers on both cable support members are provided as an optional feature to allow a smooth ride while ascending or descending the tree.

I claim:

1. A tree or the like climbing apparatus comprising:
   a platform member adapted to be raised or lowered over a tree trunk or the like, said platform including a seat portion and a single footed foot support portion;
   an independent foot climber member locatable in the same plane or above said platform member; and
   tree trunk engaging means operatively associated with said platform member and said foot climber to releasably engage said tree trunk.

2. The apparatus of claim 1 wherein said platform member includes a cut-out portion for passage of said foot climber member therethrough.

3. The apparatus of claim 1 wherein said tree trunk engaging means includes teeth members and cable support mean operatively associated with said teeth members and having rollers connected to said cable support means on said platform member and said foot climber member, said rollers spaced from said teeth members to engage said tree trunk opposite said teeth members.

4. The apparatus of claim 1 wherein said tree trunk engaging means includes a adjustable cable support member.

5. The apparatus of claim 2 wherein said teeth members are defined by pairs of a multiplicity of said teeth members, each of said pairs configured in an arcuate manner.

6. The apparatus of claim 5 wherein the teeth members are biased against the said tree trunk.

7. The apparatus of claim 1 wherein said platform member includes a forward frame portion with said seat portion pivotally attached thereto and further includes a cable member extending between said frame portion and said seat portion.

8. The apparatus of claim 1 wherein said platform member includes a pivotal stabilizer portion connected to said platform member below said foot support portion.

9. The apparatus of claim 4 wherein said tree trunk engaging means includes a winch member for adjusting said cable support member.

10. The apparatus of claim 1 wherein said foot climber member includes foot engaging straps.

11. A foot climber member for use in conjunction with a tree or the like climbing comprising:
    first and second teeth members for engagement with a portion of said tree facing a climber as the climber climbs the tree;
    a foot rest member connected to said teeth members;
    a strap member for engaging a foot of said climber operatively associated with said teeth members; and
    cable support means operatively associated with said teeth members and having rollers connected to said cable support means for engaging a portion of said tree trunk opposite said teeth members.

12. The foot climber member of claim 11 wherein teeth members are defined by a plurality of teeth aligned along a plane parallel with said tree.

13. The foot climber member of claim 12 wherein said teeth are disposed in an arcuate manner.

14. The foot climber member of claim 13 wherein the teeth members are biased against said tree trunk.

15. The foot climber member of claim 11 further including a winch for adjustable securing said cable to said teeth members.

* * * * *

UNITED STATES PATENT AND TRADEMARK OFFICE
CERTIFICATE OF CORRECTION

PATENT NO. : 5,086,874

DATED : February 11, 1992

INVENTOR(S) : Bill Treants

It is certified that error appears in the above-identified patent and that said Letters Patent is hereby corrected as shown below:

Column 3, line 7    after "FIG. 1"  --is-- should be insered.

Column 3, line 10    after "FIG. 2"  --is-- should be inserted.

Column 3, line 19    before "member" --platform-- should be inserted.

Column 4, line 2    before "the"  "o"  should read --on--.

Column 7, line 57    before "foot" "single footed" should be deleted.

Column 7, line 59    before "foot"  --single footed-- should be added.

Column 8, line 9    before "operatively"  "mean" should read --means--.

UNITED STATES PATENT AND TRADEMARK OFFICE
CERTIFICATE OF CORRECTION

PATENT NO. : 5,086,874

DATED : February 11, 1992

INVENTOR(S) : Bill Treants

It is certified that error appears in the above-identified patent and that said Letters Patent is hereby corrected as shown below:

Column 8, line 15   before "adjustable"   "a" should read --an--.

Signed and Sealed this

Twenty-fifth Day of May, 1993

Attest:

MICHAEL K. KIRK

Attesting Officer

Acting Commissioner of Patents and Trademarks